United States Patent Office 3,663,728
Patented May 16, 1972

3,663,728
PROCESS FOR PRODUCING POLYAMIDE ACID
AND POLYIMIDES
John T. Hoback and Fred F. Holub, Schenectady, N.Y.,
assignors to General Electric Company
No Drawing. Filed July 25, 1968, Ser. No. 747,460
Int. Cl. C08g 20/32
U.S. Cl. 260—29.2 N
16 Claims

ABSTRACT OF THE DISCLOSURE

Aromatic dianhydrides and diamines are reacted in a solvent comprising at least 40%, by weight of an aliphatic polyol to produce polyamide acid solutions which can be heat-cured to polyimide resins. These polyamide acid solutions can be converted to polyimides and employed as insulation over conducting cores, as laminating varnishes, as dipping varnishes to impregnate coils of previously-insulated wire in the motor and generator rotors, field coils, etc.

---

This invention relates to synthetic polymer compositions and methods of preparing such materials. More particularly, the invention is concerned with a process for preparing polyamide acid solutions, which process comprises (1) dissolving an organic diamine in a solvent comprising at least 40% by weight of an aliphatic polyol and adding to such solution at least one organic benzenoid dianhydride and (2) allowing the reactants to interact at a temperature of below about 100° C., for example, from 20° C. to 60° C. to form the polyamide acid substantially free of any polyimide groups derived from the polyamide acid. The polyamide acid solutions can then be heated to temperatures of from 125° C. to 350° C. to form polyimide polymers. This invention also includes the employment of conducting solutions of polyamide acids, such as those described above, for electrocoating of various conducting substrates.

U.S. Pat. 3,179,614 issued Apr. 29, 1965, describes a class of resins comprising polyamide acid resins which are generally prepared by the reaction of a dianhydride of an organic tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. Additionally, this patent recites the need for employing solvents for the reaction, which are relatively expensive and not readily available.

It has unexpectedly been discovered that it is possible to prepare soluble polyamide acid resins employing a solvent comprising at least 40% by weight of an aliphatic polyol without reacting the dianhydride with the polyol to produce polyesters and without the necessity of using heat. These polyamide acid resin solutions are substantially free of any polyamide groups, which gives rise to the solubility and low solution viscosity of the polymer systems, which results in improved ability to impregnate porous materials, easier coating of wires by means of dies, etc., at a high solids content. This was entirely unexpected and in no way could have been predicted because it had previously been believed that the dianhydride would react with the aliphatic polyol to product polyesters and free carboxyl groups which would prevent the formation of the polyamide acid solutions and the polyimide resins therefrom.

In accordance with the process of this invention, an organic diamine having the structural formula

where —R'— is a divalent organic radical containing at least two carbon atoms, each of the amino groups being attached to separate carbon atoms of the divalent radical, is dissolved in a solvent comprising at least 40% by weight of an aliphatic polyol having the structural formula $$HO(C_nH_{2n}-O)_sH$$

wherein $n$ is an integer having a value of from 2 to 10 and $s$ is an integer having a value of from 1 to 3, and an organic benzenoid dianhydride having the structural formula

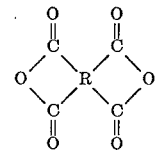

wherein R is an aromatic tetravalent organic radical is added to this solution with stirring while the solution is maintained at a temperature at which the dianhydride and the organic diamine react to produce a polyamide acid which is at least partially soluble in the solvent employed for the reaction. Inasmuch as the reaction system forms a two phase mixture in relatively short periods, a nitrogenous base can then be added to the solution of the polyamide acid to stabilize the polyamide acid and form a solution of the polyamide acid in the aliphatic polyol solvent system.

In carrying out the reaction, it is preferred to employ temperatures below about 100° C., and even more preferred, to employ temperatures below 60° C. to avoid formation of the polyimide groups in the polyamide acid solutions. It is sometimes necessary to employ external cooling in order to maintain the temperature of reaction within the above-prescribed limits.

In conducting the process of this invention, it is preferred to employ essentially equal molar amounts of the dianhydride and the diamine, although a slight excess, for example, 1.05 moles of the dianhydride per mole of the diamine, or 1 mole of the dianhydride to 1.05 moles of the diamine is advantageously employed to control the molecular weight and viscosity of the resulting polymer.

Mono-amines such as aniline, para-biphenylamine, benzylamine, or anhydrides of a dicarboxylic acid such as phthalic anhydride or maleic anhydride or other reagents reactive with amines or carboxylic acids can be employed as a reactant during the polymerization to chain stop or modify the polymers. These additional reagents may be added at the start, during or at the end of the polymer-forming reaction, and may be employed to react with any excess of either of the diamine or the dianhydride reagents employed initially.

Useful organic diamine reactants for preparing the polyamic acids are characterized by the general formula $H_2-N-R'-NH_2$ wherein —R'— is as heretofore defined and may be selected from the following general groups: aromatic, aliphatic, heterocyclic, bridged organic radicals wherein the bridging moiety is oxygen, nitrogen, sulfur, silicon, or phosphorus, and substituted groups thereof. Preferred diamines contain at least six carbon atoms preferably including a structure characterized by benzenoid unsaturation. These preferred diamines having benzenoid unsaturation may be further characterized by —R'— being identified by one of the following structures:

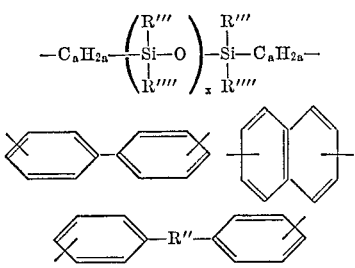

and

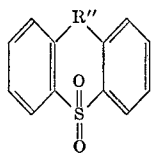

wherein the moiety —R"— can be an alkylene chain of 1 to 3 carbon atoms, —O—, —S—, —SO—, —SO$_2$—,

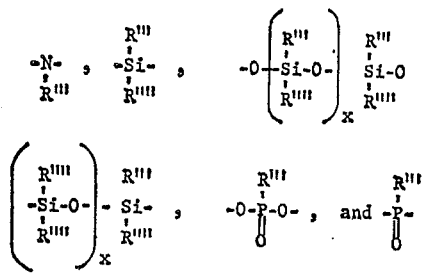

wherein $a$ has a value of from 1 to 5, $x$ is 0 to 100 or more, —R'"— and —R""— are selected from the group consisting of alkyl and aryl and substituted groups thereof, e.g. methyl, ethyl, propyl, butyl, phenyl, tolyl, etc. The following species of diamines are typical of suitable diamine reactants for practicing the invention: 4,4'-diaminodiphenyl ether, bis-(4-aminophenyl) diethyl silane, 4,4'-diamino-diphenyl methane, bis(Δ-amino butyl) tetramethyl disiloxane, 4,4'-diamino-diphenyl propane, meta-phenylene diamine, para-phenylene diamine, 4,4'-diamino-diphenyl sulfone,

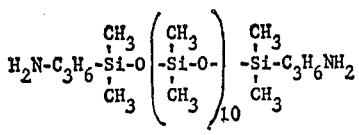

benzidine, 4,4'-diamino-diphenyl sulfide, 3,3'-diamino-diphenyl sulfone, bis-(4-amino-phenyl) phosphine oxide, bis-(4-amino-phenyl) diethyl silane, m-xylylene diamine, p-xylylene diamine, hexamethylene diamine, heptamethylene diamine, octamethylene diamine, nonamethylene diamine, decamethylene diamine, dodecamethylene diamine, 2,11 - diamino - dodecane, 3 - methylheptamethylene diamine, 4,4 - dimethylheptamethylene diamine, 2,2-dimethyl propylene diamine, 2,5-dimethylhexamethylene diamine, 2,5 - dimethylheptamethylene diamine, 5-methylnonamethylene diamine, 1,12 - diamino - octadecane, 1,4-diamino-cyclohexane, 2,6 - diaminopyridine, 1,5-diamino-naphthalene, 3,3' - dimethyl - 4,4' - diamino - biphenyl, 2,4 - bis - (beta - amino - t - butyl)toluene, bis-(para-beta - amino - t - butyl - phenyl)ether, para - bis - (2-methyl - 4 - amino - penthyl)benzene, para - bis - (1,1-dimethyl - 5 - amino - pentyl)benzene, bis - (para - amino-cyclohexyl)methane, 1,2 - bis - (3 - amino - propoxy) ethane, 3 - methoxy - hexamethylene diamine, bis - (4-amino - phenyl) - N - methylamine, 3,3' - dimethoxy benzidine, H$_2$N(CH$_2$)$_3$O(CH$_2$)$_3$O(CH$_2$)$_3$NH$_2$, H$_2$N(CH$_2$)$_3$S(CH$_2$)$_3$NH$_2$
H$_2$N(CH$_2$)$_3$N(CH$_3$)(CH$_2$)$_3$NH$_2$ Mixtures of these species of the diamines can be used to provide copolyamide acid compositions.

Useful tetracarboxylic acid dianhydride reactants are characterized by the general formula:

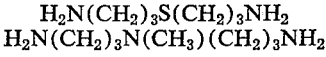

wherein the tetravalent aromatic radical

preferably contains at least one ring of six carbon atoms, said ring being characterized by benzenoid unsaturation. The four carbonyl groups of the dianhydride are each joined to separate carbon atoms and each pair of carbonyl moieties of the anhydride is joined directly to adjacent carbon atoms in the

radical to provide a 5-member anhydride ring identified as follows:

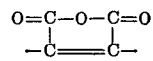

The following species are typical of tetracarboxylic acid dianhydrides suitable for practicing the invention: ethylene glycol-bis-trimellitate anhydride and dianhydrides having the formula

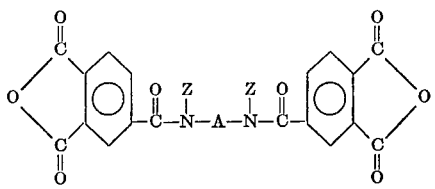

where A is alkylene or arylene and Z is hydrogen, alkyl, e.g. methyl, ethyl, propyl, etc., or aryl, e.g. phenyl, tolyl, xylyl, etc., pyromellitis dianhydride,
3,3',4,4'-benzophenone tetracarboxylic dianhydride,
2,2',3,3'-benzophenone tetracarboxylic dianhydride,
3,3',4,4'-diphenyl tetracarboxylic dianhydride,
2,2',3,3'-diphenyl tetracarboxylic dianhydride,
2,2-bis-(3,4-dicarboxyphenyl) propane dianhydride,
2,2-bis-(2,3-dicarboxyphenyl) propane dianhydride,
Bis-(3,4-dicarboxyphenyl) ether dianhydride,
Bis-(3,4-dicarboxyphenyl) sulfone dianhydride,
1,1-bis-(2,3-dicarboxyphenyl) ethane dianhydride,
1,1-bis-(3,4-dicarboxyphenyl) ethane dianhydride,
Bis-(2,3-dicarboxyphenyl) methane dianhydride,
Bis-(3,4-dicarboxyphenyl) methane dianhydride,
2,3,6,7-naphthalene tetracarboxylic dianhydride,
1,2,4,5-naphthalene tetracarboxylic dianhydride,
1,2,5,6-naphthalene tetracarboxylic dianhydride,
Benzene-1,2,3,4-tetracarboxylic dianhydride,
Perylene-3,4,9,10-tetracarboxylic dianhydride,
Pyrazine-2,3,5,6-tetracarboxylic dianhydride,
Thiophene-2,3,4,5-tetracarboxylic dianhydride,

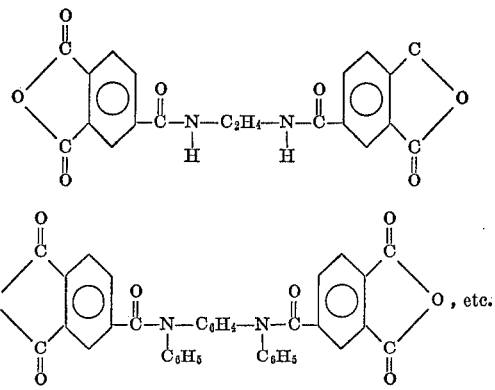

The aliphatic polyols which are useful as solvents in the process of this invention are those having the general formula

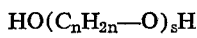

wherein $n$ and $s$ are as above defined. These aliphatic polyol solvents are for example ethylene glycol, propylene glycol, butylene glycol, hexane diol, diethylene glycol, dipropylene glycol, triethylene glycol, tripropylene glycol mixed ethylene propylene glycols, glycerine, etc.

In addition to the polyol solvent employed in the process, one can also employ mixtures of the polyols with water and/or other reactive or non-reactive organic solvents. The amount of the polyol solvent in the mixture is at least 40% by weight. These other solvents are for example, alcohols such as methanol, ethanol, etc., N,N-dialkyl carboxyl amides such as N,N-dimethyl formamide, N,N-diethyl acetamide, N,N-dimethylacetamide, etc., N-methyl pyrrolidone, dimethylsulfoxide, tetramethylene urea, pyridine, dimethyl sulfone, hexamethyl phosphoramide, N-acetyl-2-pyrrolidone, benzene, toluene, benzonitrile cresol, phenol, cyclohexane, cyclohexanone N-methylmorpholine, methyl ethyl ketone, acetone, methyl acetate, glycol ethers such as the methoxy ethanol, butoxy ethanol, dimethoxy ethane, diethoxy ethane, 1,3-dioxolane, 1,4-dioxolane, etc.

The nitrogenous bases which can be added to stabilize the polyamide acid polymers produced by the reaction of an organic diamine and an organic tetracarboxylic acid dianhydride in the aliphatic polyol solvent in accordance with the process of this invention are base-acting nitrogen compounds and include, for example, ammonia, primary amines, secondary amines, tertiary amines, heterocyclics which react like tertiary amines, and quaternary ammonium compounds. These nitrogenous reagents are, for example, ammonia, ammonium hydroxide, tetraethyl ammonium hydroxide, tetramethyl ammonium hydroxide, triethylamine, n-methylmorpholine, n-ethylmorpholine, pyridine, methylamine, ethylamine, diethylamine, dimethylamine, N,N-dimethyl ethanolamine, etc.

The polyamide acid solutions produced in accordance with the process of this invention can be cured to polymeric polyimide polymers by heating to temperatures of from about 125° C. to 300° C. or higher, and form clear, flexible films when cast on glass substrates. In applying coatings or depositing films from solutions, the temperatures employed to remove the solvent should be raised gradually to obtain smooth coatings and films.

The addition of the nitrogenous base to the polyamide acid solutions in addition to stabilizing the solution also makes the solutions electrically conductive so that the polyamide acids can be electrocoated on various conducting substrates employing direct current processes and then cured at elevated temperatures to yield polyimide polymer coatings on such substrates.

The amount of solvent employed is not narrowly critical, and can range by weight from as low as 50 parts solvent per 100 parts of the dianhydride and diamine reactants to as high as 1,000 or more parts solvent to 100 parts of the reactants. The amount of solvent employed should be sufficient to produce a homogeneous solution with the reactants and the polyamide acid prepolymer, and yet not be too viscous so as to be difficult to handle.

The following examples serve to further illustrate this invention. All parts are parts by weight unless otherwise expressly stated.

EXAMPLE 1

A reaction vessel flushed with nitrogen was charged with distilled ethylene glycol (24.19 g.), distilled water (6.05 g.), p,p'-methylene dianiline (1.59 g., 0.00801 M) and (0.55 g., 0.002 M) 1,3 - bis - Δ - aminobutyltetramethyldisiloxane. The mixture was stirred until all the dianiline was dissolved and then benzophenone tetracarboxylic dianhydride (3.32 g., 0.0103 M) was added slowly over a 10 minute period with vigorous stirring. The reaction mixture was stirred at room temperature for 5–10 minutes, during which time the polymer separated out of solution. To the heterogeneous system, N-methyl morpholine (2.03 g., 0.02 M) was added with stirring to form a homogeneous solution. The solution was stirred for five hours, filtered and films were cast on an aluminum surface wiped with trichlorobiphenyl and cured at room temperature for 30 minutes, 50° C./1 hr., 100° C./1 hr., 150° C./1 hr., 200° C./1 hr., and 250° C./1 hr. The film was very flexible.

EXAMPLE 2

A reaction vessel flushed with nitrogen was charged with distilled ethylene glycol (154.16 g.), distilled water, (38.5 g.) and p,p'-methylene dianiline (20.02 g., 0.101 M). The mixture was stirred until all the dianiline was dissolved and then benzophenone tetracarboxylic dianhydride (33.19 g., 0.103 M) was added slowly over a 15 minute period with vigorous stirring. The reaction mixture was stirred at room temperature for 5–10 minutes, during which time the polymer separated out of solution. To the heterogeneous system, N-methyl morpholine (20.33 g., 0.2 M), was added, to yield a homogeneous solution. The solution was stirred for five hours, filtered and films were cast on a glass surface and cured at room temperature for 30 minutes, 50° C./1 hr., 100° C./1 hr., 150° C./1 hr., 200° C./1 hr., and 250° C./1 hr. The film was very flexible and had a cut through temperature of greater than 400° C.

EXAMPLE 3

A reaction vessel flushed with nitrogen was charged with distilled ethylene glycol (20.69 g.), distilled water (5.17 g.), and p,p'-methylene dianiline (2.0 g., 0.0101 M). The mixture was stirred until all the dianiline was dissolved and then benzophenone tetracarboxylic dianhydride (3.32 g., 0.0103 M) was added slowly over a 10 minute period with vigorous stirring. The reaction mixture was stirred at room temperature for 5–10 minutes, during which time the polymer separated out of solution. To the heterogeneous system, 30% ammonium hydroxide in water (1.14 g.) was added, which solubilized the polyamide acid to yield a homogeneous solution. The solution was stirred for five hours, filtered, and films were cast on a glass surface and cured at room temperature for 30 minutes, 50° C./1 hr., 100° C./1 hr., 150° C./1 hr., 200° C./1 hr. and 250° C./1 hr. The film was very flexible and had a cut through temperature of greater than 400° C.

EXAMPLE 4

A reaction vessel flushed with nitrogen was charged with distilled ethylene glycol (14.12 g.), methylethylketone (9.42 g.), distilled water (5.89 g.), and p,p'-methylene dianiline (2.0 g. .0101 M). The mixture was stirred until all the dianiline was dissolved and then benzophenone tetracarboxylic dianhydride (3.32 g. .0103 M) was added slowly over a 10 minute period with vigorous stirring. The reaction mixture was stirred at room temperature for 5–10 minutes, during which time the polymer separated out of solution. To the heterogeneous system N-methyl morpholine (2.03 g. 0.02 M) was added, which solubilized the polyamide acid to obtain a homogeneous solution. The solution was stirred for five hours, filtered and films were cast on a glass surface and cured at room temperature for 30 minutes, 50° C./1 hr., 100° C./1 hr., 150° C./1 hr., 200° C./1 hr., and 250° C./1 hr. The film was very flexible and had a cut through temperature of 400+° C.

EXAMPLE 5

Several runs were made according to the procedure of Example 4, but employing different mixtures of solvents. The results are summarized in Table I.

TABLE I

| | | |
|---|---|---|
| p,p'-Methylene dianiline, grams | 2.0 | 2.0 |
| Benzophenone tetracarboxylic dianhydride, grams | 3.32 | 3.32 |
| Ethylene glycol, grams | 14.12 | 14.12 |
| Water, grams | 5.89 | 5.89 |
| Isopropanol, grams | 9.42 | |
| Ethyl acetate, grams | | 9.42 |
| N-methyl morpholine, grams | 2.03 | 2.03 |
| Solution | Clear | Cloudy |
| Film integrity | (1) | (1) |

[1] Flexible.

EXAMPLE 6

Several runs were made in accordance with the procedure of Example 3 but employing a different dianhydride or diamine. The results are given in Table II.

TABLE II

| | | |
|---|---|---|
| p,p'-Methylene dianiline, grams | 2.0 | |
| Meta-phenylene diamine, grams | | 1.09 |
| Benzophenone tetracarboxylic dianhydride, grams | 3.32 | |
| Pyromellitic dianhydride, grams | | 2.18 |
| Ethylene glycol, grams | 20.27 | 19.87 |
| Water, grams | 5.07 | 4.97 |
| N-methyl morpholine, grams | 2.03 | 2.03 |
| Solution | Clear | Cloudy |
| Film integrity | (1) | (1) |
| Film cut through,° C | 400+ | 400+ |

[1] Flexible.

EXAMPLE 7

A reaction vessel flushed with nitrogen was charged with distilled ethylene glycol (208.8 g.), and p,p'-methylene dianiline (20.0 g., 0.101 M). The mixture was stirred until all the dianiline was dissolved and then benzophenone tetracarboxylic dianhydride (32.2 g., 0.1 M) was added slowly with vigorous stirring. The reaction mixture was stirred at room temperature for 20–30 minutes to give a polyamide acid resin of about 20% solids in ethylene glycol. At this time 30% ammonium hydroxide (11.4 g.) was added and the mixture was stirred at room temperature until a homogeneous solution was obtained. The solution was filtered, films were cast on a glass surface and cured under nitrogen at 100° C.—1 hour, 150° C.—1 hour, 200° C.—1 hour and 250° C.—1 hour. These films were flexible and had a cut-through temperature of 410+° C. A sample of the polyamide acid resin was electrocoated on copper wire at 12 volts for 30 seconds using pulse D.C. and a Pt cathode. The coated copper wire was cured at 135° C. for 1 hour and 250° C. for 1 hour. It was found that the copper wire had a thin, pinhole-free film which was very flexible and had good adhesion.

EXAMPLE 8

A reaction vessel flushed with nitrogen was charged with distilled ethylene glycol (31.28 g.) and p,p'-methylene dianiline (2.99 g., 0.0151 M). The mixture was stirred until all the dianiline dissolved and then benzophenone tetracarboxylic dianhydride (4.83 g., 0.015 M) was added slowly with vigorous stirring. The reaction mixture was stirred at room temperature for 5–10 minutes to give a polyamide acid resin of about 20% solids in ethylene glycol. At this time, 30% aqueous N-ethyl morpholine (21.0 g.) was added and the mixture was stirred at room temperature until a homogeneous solution was obtained. The solution was filtered, films were cast on a glass surface and cured under nitrogen at 100° C.—1 hour, 150° C.—1 hour, 200° C.—1 hour and 250° C.—1 hour. These films were flexible and had a cut-through temperature of greater than 415+° C.

EXAMPLE 9

A reaction vessel flushed with nitrogen was charged with distilled ethylene glycol (20.88 g.) and p,p'-methylene dianiline (2.0 g., 0.0101 M). The mixture was stirred until all the dianiline was dissolved and then benzophenone tetracarboxylic dianhydride (3.22 g., 0.01 M) was added slowly with vigorous stirring. The reaction mixture was stirred at room temperature for 20–30 minutes to give a polyamide acid resin of about 20% solids in ethylene glycol. At this time 10% aqueous tetraethyl ammonium hydroxide (29.45 g., 0.02 M) was added and the mixture was stirred at room temperature until a homogeneous solution was obtained.

EXAMPLE 10

A reaction vessel flushed with nitrogen was charged with distilled ethylene glycol (208.8 g.) and p,p-methylene dianiline (20.0 g., 0.101 M). The mixture was stirred until all the dianiline was dissolved and then benzophenone tetracarboxylic dianhydride (32.2 g., 0.1 M) was added slowly with vigorous stirring. The reaction mixture was stirred at room temperature for 20–30 minutes to give a polyamide acid resin of about 20% solids in ethylene glycol. At this time, N-methyl morpholine (20.23 g., 0.2 M) was added and the mixture was stirred at room temperature until a homogeneous solution was obtained.

The solution was filtered before films were cast on a glass surface and cured under nitrogen at 100° C.—1 hour, 150° C.—1 hour, 200° C.—1 hour and 250° C.— 1 hour. These films were flexible and had a cut-through temperature of greater than 420° C.

EXAMPLE 11 p,p'-Methylene dianiline (2.0 g.) was reacted with benzophenone tetracarboxylic dianhydride (3.22) in a series of solvents or solvent mixtures employing the procedure of Example 10. The results are given in Table III.

TABLE III

| | | | | | | |
|---|---|---|---|---|---|---|
| p,p'-Methylene dianiline, grams | 2.0 | 2.0 | 2.0 | 2.0 | 2.0 | 2.0 |
| Benzophenone tetracarboxylic dianhydride, grams | 3.22 | 3.22 | 3.22 | 3.22 | 3.22 | 3.22 |
| Ethylene glycol, grams | | 12.53 | 12.53 | 12.53 | 12.53 | 12.53 |
| Diethylene glycol, grams | 20.88 | | | | | |
| Methylethyl ketone, grams | | 8.35 | | | | |
| Isopropanol, grams | | | 8.35 | | | |
| Methyl acetate, grams | | | | 8.35 | | |
| o-Cresol, grams | | | | | 8.35 | |
| Glycerine, grams | | | | | | 8.35 |
| 30% aqueous solution ammonium hydroxide, grams | 1.14 | 1.14 | 1.14 | 1.14 | 1.14 | 1.14 |
| Solution | Clear | Clear | Cloudy | Cloudy | Cloudy | Clear |
| Percent solids | 20 | 20 | 20 | 20 | 20 | 20 |
| Film integrity | (1) | (1) | (1) | (1) | (1) | |
| Film cut-through, ° C | 400+ | | | 400+ | 405+ | |

[1] Flexible.

EXAMPLE 12

Several runs were made employing the procedures of Example 10, but using a different dianhydride or diamine. The results are given in Table IV.

TABLE IV

| | | | | |
|---|---|---|---|---|
| p,p'-Methylene dianiline, grams | | | 4.0 | |
| Meta-phenylene diamine, grams | 1.09 | | | |
| Sulfonyl dianiline, grams | | 4.99 | | 2.51 |
| Benzophenone tetracarboxylic dianhydride, grams | 3.22 | 6.44 | 6.44 | 3.22 |
| Ethylene glycol, grams | 17.24 | 45.87 | 25.06 | 15.41 |
| o-Cresol, grams | | | 16.70 | |
| Phenol, grams | | | 3.76 | |
| Butyl cellosolve, grams | | | | 7.02 |
| 30% aqueous solution ammonium hydroxide, grams | 1.14 | 1.14 | | |
| N,N-dimethyl formamide, grams | | | | 1.71 |
| Solution | Cloudy | Cloudy | Cloudy | Clear |
| Percent solids | 20 | 20 | 20 | 19 |
| Film integrity | (¹) | | | (¹) |
| Film cut-through, °C | 415+ | | | |

¹ Flexible.

EXAMPLE 13

Several additional runs were made employing the procedure of Example 10, but using different diamines. The results are given in Table V.

TABLE V

| | | | | | | | | | |
|---|---|---|---|---|---|---|---|---|---|
| Metaphenylene diamine, grams | | | | | | | 21.9 | 21.9 | 21.9 |
| p,p'-Sulfonyl dianiline, grams | 49.7 | 49.7 | 49.7 | 49.7 | 49.7 | 49.7 | | | |
| Benzophenone tetracarboxylic dianhydride, grams | 64.4 | 64.4 | 64.4 | 64.4 | 64.4 | 64.4 | 64.4 | 64.4 | 64.4 |
| Ethylene glycol, grams | 188 | 82.1 | 154.4 | 38.1 | 88.3 | 131.4 | 86.3 | 46.3 | 42.4 |
| Methylethylketone, grams | | 54.8 | | 25.4 | 58.9 | | | | 28.3 |
| Water, grams | | 34.2 | | 15.9 | | | 43.0 | | 17.7 |
| N-methyl morpholine, grams | | 40.7 | | | | | | 40.7 | 40.7 |
| Ammonium hydroxide (28% NH₃), grams | 23.9 | | | | 23.9 | | | | |
| Triethylamine, grams | | | | | | 40.5 | 40.5 | | |
| Morpholine, grams | | | | 34.8 | | | | | |
| N,N-dimethyl formamide, grams | | | 30.0 | | | | | | |
| Solution | Clear | Clear | Clear | Clear | Clear | Clear | Clear | Clear | Clear |
| Percent solids | 35 | 35 | 35 | 50 | 40 | 40 | 40 | 40 | 40 |
| Gardner-Holdt viscosity | | E½ | Z6 | Z5¼+ | | | Z-4 | Z-4 | |

Although the utility of the polymer solutions of the present invention have been described in the above-mentioned patents principally in terms of applications as flexible films, it should be understood that these polymers may be used in other applications suitable for such compositions. Thus these polyamide acid resins can be converted to polyamides and employed as insulation over a conducting core. Additionally, these polyimides can be employed over a conducting core previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations, by mixing with various fillers, for example, wood flour, diatomaceous earth, carbons, silica, abrasive grains; e.g., Carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described, it is possible to synthesize completely aromatic polyamide acids in inexpensive aliphatic polyol systems. This simple direct process allows the preparation of coating solutions that are easily prepared and have greater flexibility on application to glass and metal surfaces. By the process of this invention, very simple mixing techniques are employed to produce a polymer solution useful for bonding glass fibers, for making laminations and for coating metal substrates for use as thermal and electrical insulating films.

It will, of course, be apparent to those skilled in the art that other dianhydrides and other diamines may be employed in place of those recited in the foregoing examples, many illustrations of these reactants having been given previously, without departing from the scope of the invention. The ratio of reactants as well as the proportions of the solvent and amine additive may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, leveling additives, etc., is not precluded.

What is claimed is:

1. A process for producing a polyamide acid solution which comprises (1) dissolving at least one organic diamine having the formula $H_2N-R'-NH_2$ wherein R' is a divalent organic radical containing at least two carbon atoms, each of the amino groups being attached to separate carbon atoms of the divalent radical, in a solvent comprising at least 40% by weight of an aliphatic polyol and (2) adding to the resulting solution of (1) at least one organic benzenoid dianhydride having the structural formula

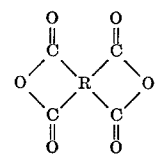

to produce a heterogeneous mixture and (3) adding a stabilizing amount of a nitrogen containing base to convert the resulting mixture to a solution, wherein R is a tetravalent organic radical containing at least one ring of six carbon atoms, said ring characterized by benzenoid unsaturation, the four carbonyl groups being attached directly to separate carbon atoms in a ring of the R radical, and each pair of carbonyl groups being attached to adjacent carbon atoms in a ring of the R radical, said diamine and said dianhydride being employed in approximately equal molar quantities, while maintaining the temperature below 100° C. whereby said diamine and said dianhydride react to produce a polyamide acid solution.

2. A process in claim 1 wherein the diamine is metaphenylene diamine.

3. A process as in claim 1 wherein the diamine is 4,4'-methylenedianiline.

4. A process as in claim 1 wherein the diamine is sulfonyl dianiline.

5. A process as in claim 1 wherein the organic dianhydride is 3,3',4,4'-benzophenonetetracarboxylic acid dianhydride.

6. A process as in claim 1 wherein the solvent is ethylene glycol.

7. A process as in claim 1 wherein the solvent is a mixture of ethylene glycol and water.

8. A process as in claim 1 wherein the nitrogen containing base is ammonia.

9. A process as in claim 1 wherein the nitrogen containing base is ammonium hydroxide.

10. A process as in claim 1 wherein the nitrogen containing base is morpholine.

11. A process as in claim 1 wherein the nitrogen containing base is triethylamine.

12. A process as in claim 1 wherein the nitrogen containing base is n-methylmorpholine.

13. A process as in claim 1 wherein the solvent is diethylene glycol.

14. A process as in claim 1 wherein the polyamide acid solution is heated to a temperature of from 125° C. to 450° C. to form a polyimide.

15. A process as in claim 1 wherein the diamine is 1,3-bis-Δ-amino butyl tetramethyl disiloxane.

16. A process as in claim 1 wherein the solvent is diethylene glycol.

References Cited
UNITED STATES PATENTS

| | | | |
|---|---|---|---|
| 2,710,853 | 6/1955 | Edwards et al. | 260—78 |
| 2,880,230 | 3/1959 | Edwards et al. | 260—78 |
| 2,927,906 | 3/1960 | Schlack | 260—29.2 |
| 3,190,856 | 6/1965 | Lavin et al. | 260—78 |
| 3,242,136 | 3/1966 | Laszlo | 260—78 |
| 3,356,691 | 12/1967 | Gaertner | 260—78 |
| 3,377,310 | 4/1968 | Serlin et al. | 260—78 |
| 3,423,366 | 1/1969 | De Brunner et al. | 260—33.4 |
| 3,440,197 | 4/1969 | Boldebuck et al. | 260—29.2 |
| 3,448,068 | 6/1969 | Holub et al. | 260—29.2 |
| 3,507,765 | 4/1970 | Holub et al. | 260—29.2 N |
| 3,528,937 | 9/1970 | Reynolds et al. | 260—29.2 N |

JULIUS FROME, Primary Examiner

A. H. KOECKERT, Assistant Examiner

U.S. Cl. X.R.

204—181; 260—29.2 M, 30.6 R, 30.8 DS, 31.2 N, 31.4 R, 32.6 N, 32.8 N, 33.2 R, 33.4 R, 33.4 P, 78 TF